US012454862B2

(12) United States Patent
Grosberg

(10) Patent No.: US 12,454,862 B2
(45) Date of Patent: Oct. 28, 2025

(54) CURTAIN/SHUTTER WHICH FLIPS AND CHANGES TO SEVERAL OPTIONS

(71) Applicant: Nachum Grosberg, Jerusalem (IL)

(72) Inventor: Nachum Grosberg, Jerusalem (IL)

( * ) Notice: Subject to any disclaimer, the term of this patent is extended or adjusted under 35 U.S.C. 154(b) by 156 days.

(21) Appl. No.: 18/026,356

(22) PCT Filed: Sep. 14, 2021

(86) PCT No.: PCT/IL2021/051117

§ 371 (c)(1),
(2) Date: Mar. 15, 2023

(87) PCT Pub. No.: WO2022/059004

PCT Pub. Date: Mar. 24, 2022

(65) Prior Publication Data

US 2023/0383598 A1 Nov. 30, 2023

(30) Foreign Application Priority Data

Sep. 16, 2020 (IL) .......................................... 277425

(51) Int. Cl.
*E06B 9/42* (2006.01)
*E06B 9/58* (2006.01)

(52) U.S. Cl.
CPC .......... *E06B 9/42* (2013.01); *E06B 2009/583* (2013.01)

(58) Field of Classification Search
CPC ........ E06B 9/52; E06B 2009/583; E06B 9/66; A47H 2001/021
See application file for complete search history.

(56) References Cited

U.S. PATENT DOCUMENTS

| | | | | |
|---|---|---|---|---|
| 3,186,473 | A * | 6/1965 | Myers | E06B 9/24 359/227 |
| 4,649,980 | A * | 3/1987 | Kunz | E06B 9/24 160/310 |
| 4,766,941 | A * | 8/1988 | Sloop | E06B 9/40 160/310 |
| 4,813,198 | A * | 3/1989 | Johnston | B60J 1/2044 160/241 |
| 5,249,616 | A * | 10/1993 | Yen | E06B 9/264 160/310 |
| 7,234,501 | B1 * | 6/2007 | Park | E06B 9/264 160/90 |
| 8,020,602 | B2 | 9/2011 | Smith et al. | |

(Continued)

FOREIGN PATENT DOCUMENTS

| | | |
|---|---|---|
| DE | 3526745 | 2/1987 |
| DE | 202006000350 | 3/2006 |

OTHER PUBLICATIONS

PCT/IL2021/051117. International Search Report mailed Jan. 11, 2022.

*Primary Examiner* — Beth A Stephan
(74) *Attorney, Agent, or Firm* — Joseph E. Maenner; Maenner & Associates, LLC

(57) ABSTRACT

A frame assembly with a sheet for a window or door space provides a frame and a sheet mounted in the frame such that the sheet is movable within the frame between a closed position wherein the sheet provides the appearance of a painting and an open position wherein the sheet rolls into the frame and provides the appearance of nothing being in the frame.

5 Claims, 1 Drawing Sheet

(56) References Cited

U.S. PATENT DOCUMENTS

| | | | | |
|---|---|---|---|---|
| 8,959,835 | B2 * | 2/2015 | Drohan | E06B 3/6722 49/63 |
| 10,214,958 | B2 * | 2/2019 | Hall | E06B 9/72 |
| 10,577,859 | B2 | 3/2020 | Vasylyev | |
| 10,676,990 | B2 * | 6/2020 | Delvecchio | B60J 1/2025 |
| 10,871,029 | B2 * | 12/2020 | Ter Haar | E06B 9/325 |
| 10,927,598 | B2 * | 2/2021 | Crider | E06B 9/70 |
| 11,643,865 | B2 * | 5/2023 | Hoogland | E06B 9/581 160/100 |
| 2003/0234087 | A1 | 12/2003 | Jones | |

* cited by examiner

CURTAIN/SHUTTER WHICH FLIPS AND CHANGES TO SEVERAL OPTIONS

BACKGROUND OF THE INVENTION

Field of the Invention

The invention relates to a curtain or shutter that looks like a picture when closed and, when open, looks like a window frame with no curtain at all.

Description of the Related Art

It would be beneficial to provide a curtain or shutter that looks like a picture when closed and, when open, looks like a window frame with no curtain at all.

BRIEF DESCRIPTION OF THE INVENTION

Briefly, the invention provides a frame assembly with a sheet for a window or door space comprising a frame and a sheet mounted in the frame such that the sheet is movable within the frame between a closed position wherein the sheet provides the appearance of a painting and an open position wherein the sheet rolls into the frame and provides the appearance of nothing being in the frame.

DETAILED DESCRIPTION OF THE INVENTION

Figure 1:
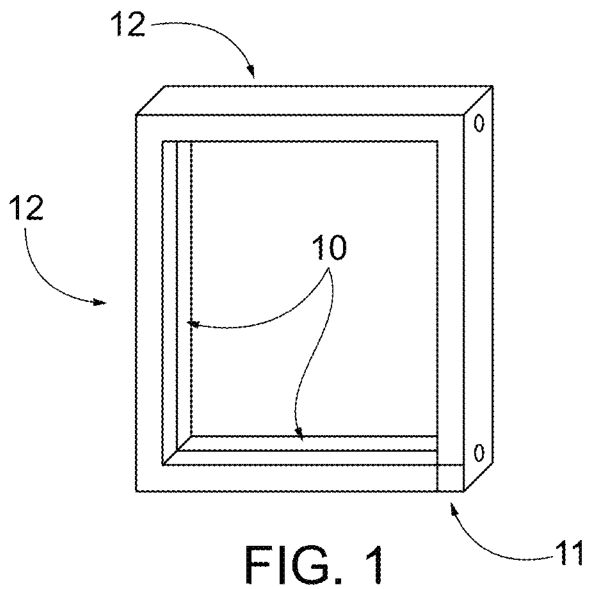
FIG. 1 provides an exploded schematic view of a curtain and operating mechanism used with the frame of FIG. 1.
Figure 2:
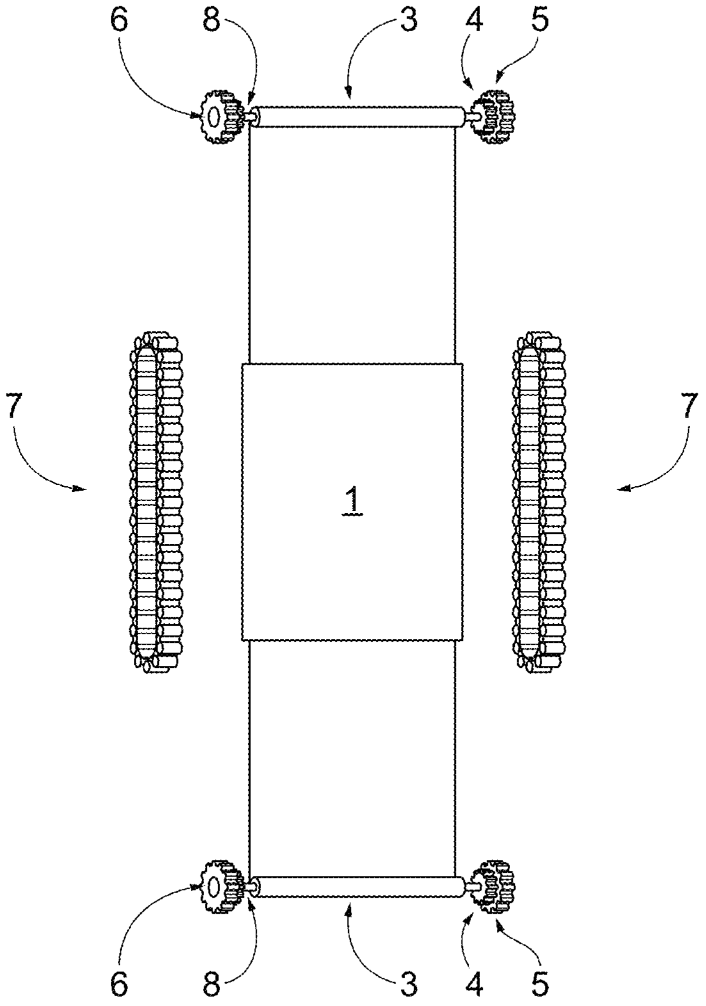
FIG. 2 is a perspective view of the curtain of FIG. 1.

1. A Curtain or, shutter (the sections below apply to the curtain, except for the current section that also applies to the shutter) that rises from the bottom of the window or door upwards so that people shouldn't be able to look into the room from the outside (such as a ground floor window or a regular window which extends from tire ground up, etc.), but allowing air to enter from above, and also descends from above downwards when you want shade the sun from above while leaving it open from below.
2. The curtain is to be wind resistant and stay stable and straight even when the window is open and wind enters.
3. When completely closed creates a hermetically sealed closure to the window, complete separation from outside and complete darkness inside the room.
4. When closed the window becomes a framed picture. (Such that it is not noticeable that it is a closed window with a curtain)
5. When fully open, it looks like a window frame with no curtain at all. Referring specifically to FIGS. 1 and 2, a sheet or shutter (henceforth called sheet) (item 1), which will fit into the frame (item 12) which is the size of the window. From the four corners of the sheet there will be strings (item 2) slightly longer than the length of the window.

At the edge of the rods (item 8) there will be gears (item 4).

The frame (item 12) which is the size of the window will mount on to the window frame.

The rods (item 8) which are the size of the frame's (item 12) width, will be in an indent on the other frame (item 9), on the upper and lower portions of this frame.

The rods (item 8) will be placed into the top and bottom indents in the frame (item 9), while the strings (item 2) are rolled around and stretched on them.

Over gears (item 4) a chain (item 7) will be passed. (in order to prevent the strings and the curtain from loosening). (And on the shutter the connection on the lower part and the stretching of the strings and the chain create a condition of easy rotation without obstruction whenever it is being rolled down).

On the edges of the frame (item 12)(from the right and left) on the inner part there will be grooves (item 10) that the curtain sheet (item 1) will be inserted slightly. (For hermetically sealed closing, the stability of the cloth and the perfect appearance of the picture).

In the frame (item 10) on the top and the bottom, there will be slits for the curtain to exit from the top and bottom.

The rods (item 3) will be wide at the sides (item 5) and will protrude at to the frame's height precisely (with the groove in the frame (item 11)) so they should be able to rotate. Or an option to rotate it from the edges of the frame. (Using a protrusion from that rod (item 6). Also by passing a string from the top to the bottom at the edges of the rods).

On the cloth (item 1) it will be possible to print any picture (or to stick any picture made of cloth or any suitable material).

It will be possible to build it in to the window's structure, as the widow itself is built.

It will also be possible to incorporate a spring which will close the curtain by pressing a button (by releasing a gear which will be connected to a spring or things like that) additionally it will be possible to operate mechanically, and it will combine both mechanical and manual options.

Even though it mentions in the above description a sheet or a cloth curtain, it is also possible to use any material which can be used as a partition or shade.

And even though it mentions in the above description a top part and a bottom part, it can also be placed diagonally, tilted, or any orientation.

And even though it mentions in the above description a window or door space, the description is used as an example for the idea.

And even though we brought one example for building the product, there are other methods and the above is an example for the idea.

The exemplary elements of the invention in reference to FIG. 2, are:

1. A curtain/shutter
2. Strings/belts, which connect the curtain/shutter (henceforth curtain) to shafts which the curtain rotates on them as it opens.
3. Shafts which the curtain rolls up on as it opens.
4. A gear which on it a chain belt which connects between the upper wheel to the lower one and creates a uniform motion of the upper and lower shafts and makes it impossible for the curtain and the strings to loosen or spin about itself.
5. Widening of the rod at its edge to leave the curtain frame for holding in order to open and close the curtain (if option 6 is not relevant).

6. The rod protrusion from the frame to the side (where possible) in order to rotate the rod for opening or closing the curtain.
7. The chain's belt which connects the upper to the lower gears to ensure that the rods spin together and the curtain should open and close without becoming loose or spin around the rod.
8. The rod should be narrow in a manner that the string/belt will rotate on it.
9. The opening for the rod's edge to create the ability to open and close the curtain by rotating the end of the rod.
10. Openings for inserting the curtain at the edges to create additional balance for the curtain, and to make a greater view of the picture.
11. The rod exiting for rolling up the curtain and opening and closing it (whenever it is impossible to do from the sides).
12. A frame for the curtain which creates a picture look when closed, and a window view when open, without a curtain look at all (this can be built in the window frame itself during the window production).

The invention claimed is:

1. A frame assembly with a sheet for a window or door space comprising:

a frame; and a sheet mounted in the frame such that the sheet is movable within the frame between a closed position wherein the sheet provides the appearance of a painting and an open position wherein the sheet rolls into the frame and provides the appearance of nothing being in the frame, wherein, when the sheet is in the closed position, the sheet forms a hermetic seal to the frame.

2. The frame assembly according to claim 1, wherein the frame has a top portion and a bottom portion and wherein the sheet is movable into one of the top portion and the bottom portion of the frame.

3. The frame assembly according to claim 1, wherein the frame includes an internal slot along vertical sides thereof and wherein the sheet is slidable within the slots.

4. The frame assembly according to claim 3, further comprising:

an upper rod extending across a top portion of the frame;

a string connected to the upper rod such that the string stabilize the sheet by being tied from the sheet to the upper rod.

5. The frame assembly according to claim 4, further comprising:

a lower rod located distal from the upper rod;

a belt connecting the upper rod and the lower rod, wherein the belt causes the sheet to become tight.

* * * * *